UNITED STATES PATENT OFFICE.

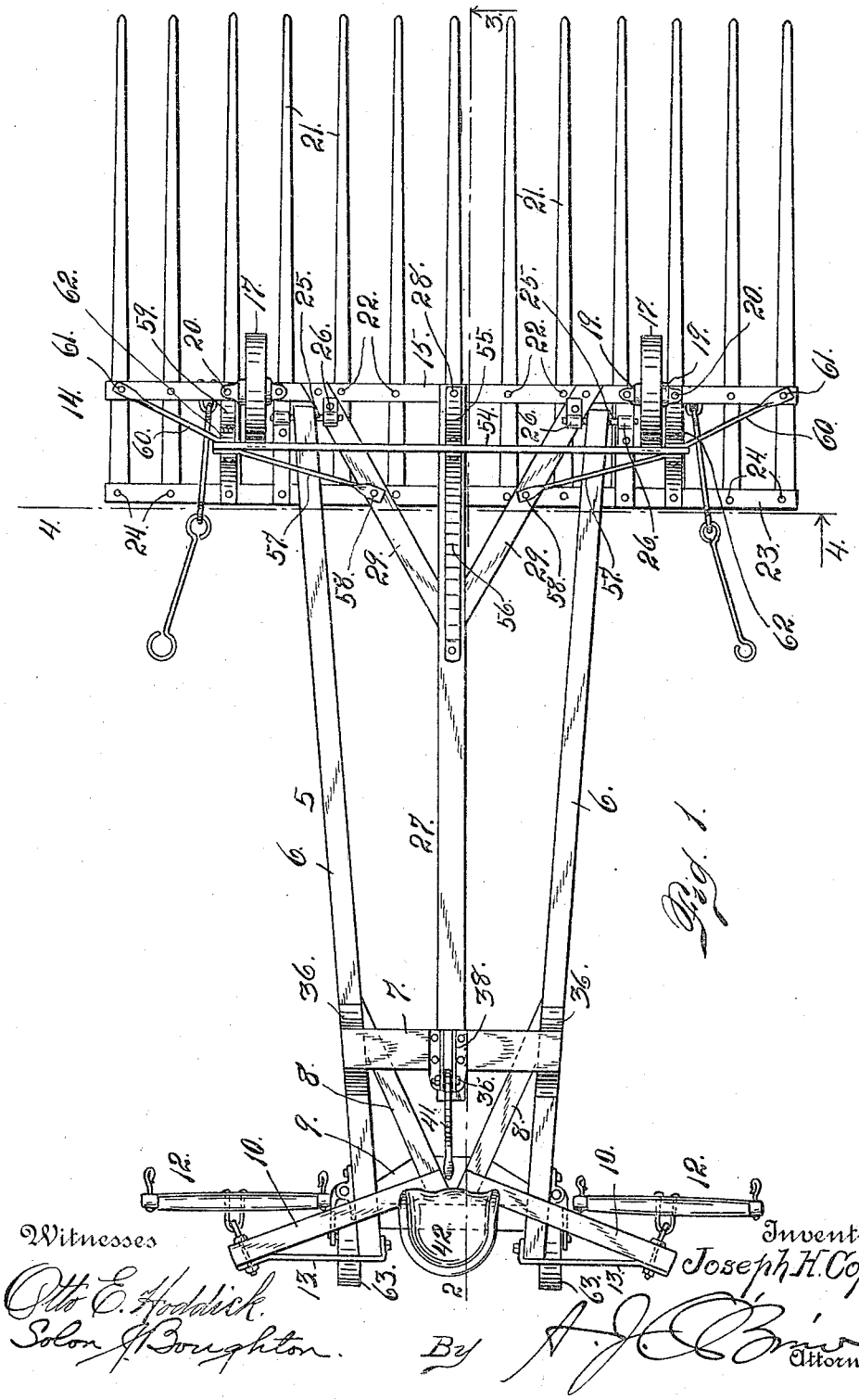

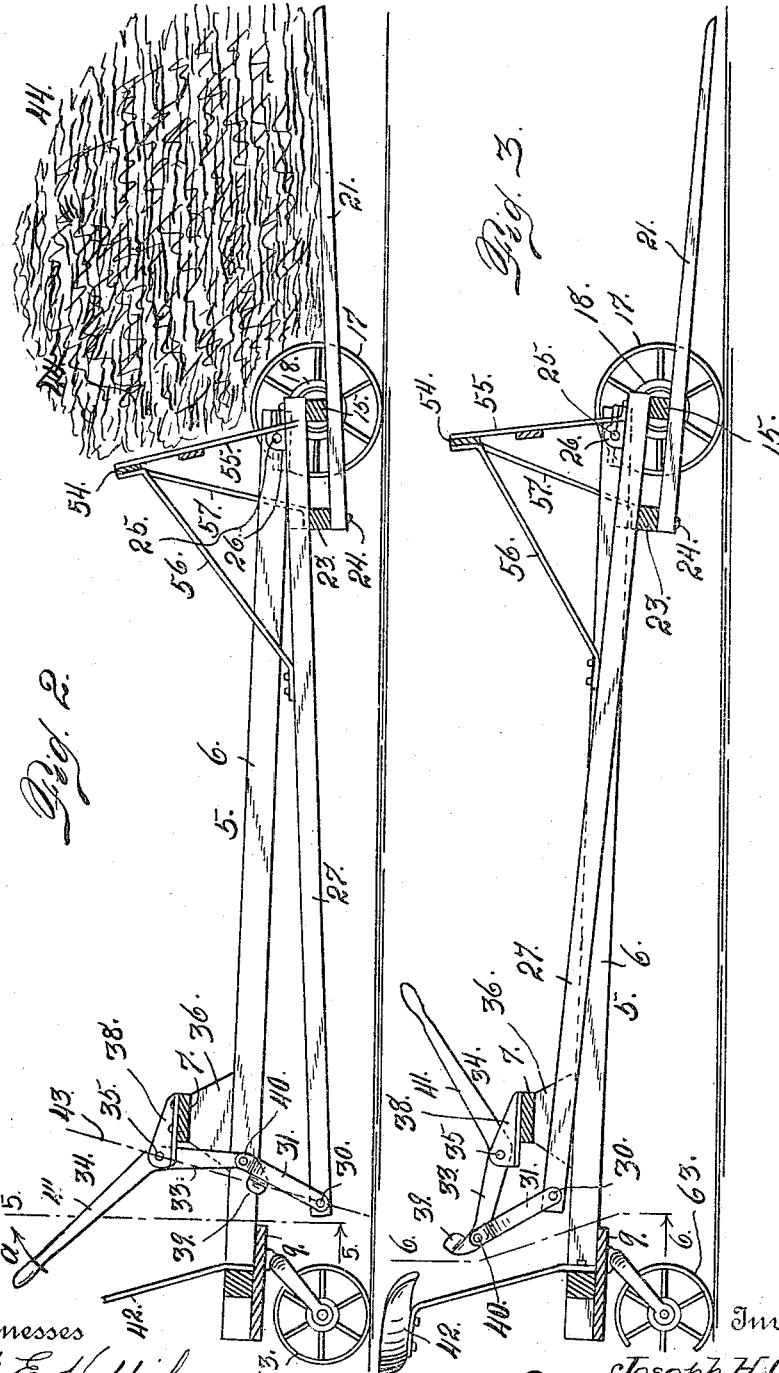

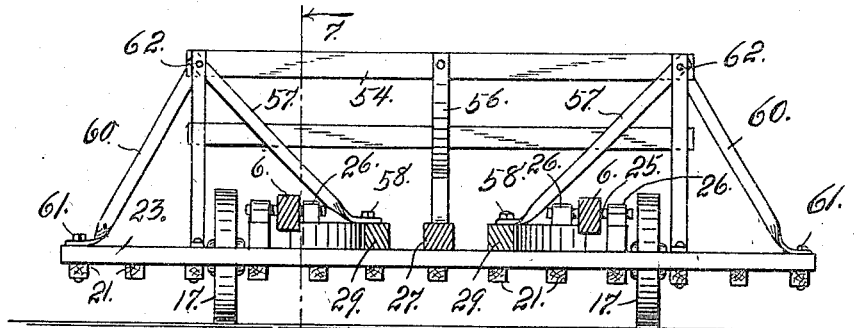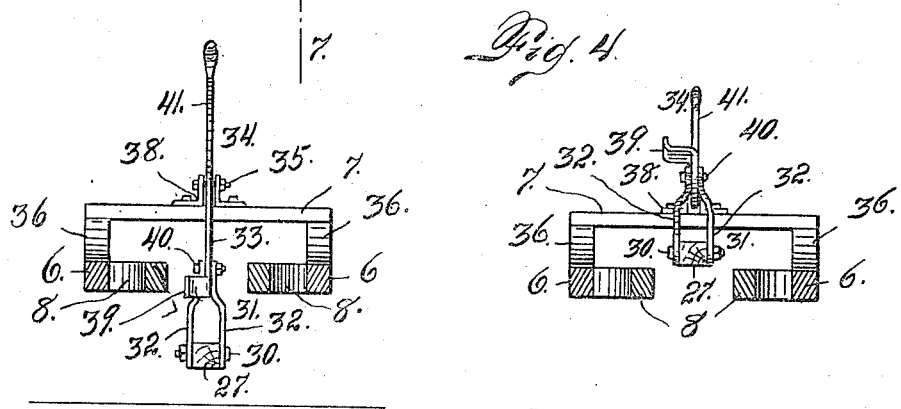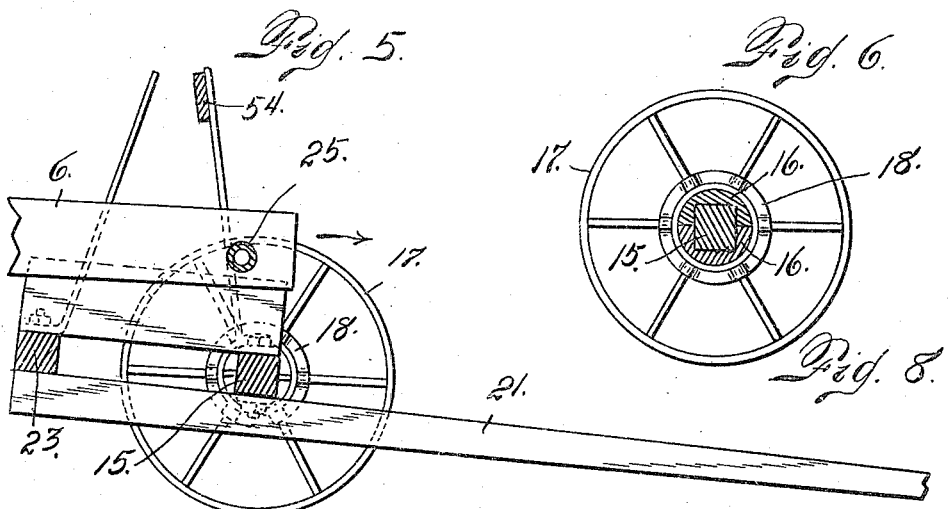

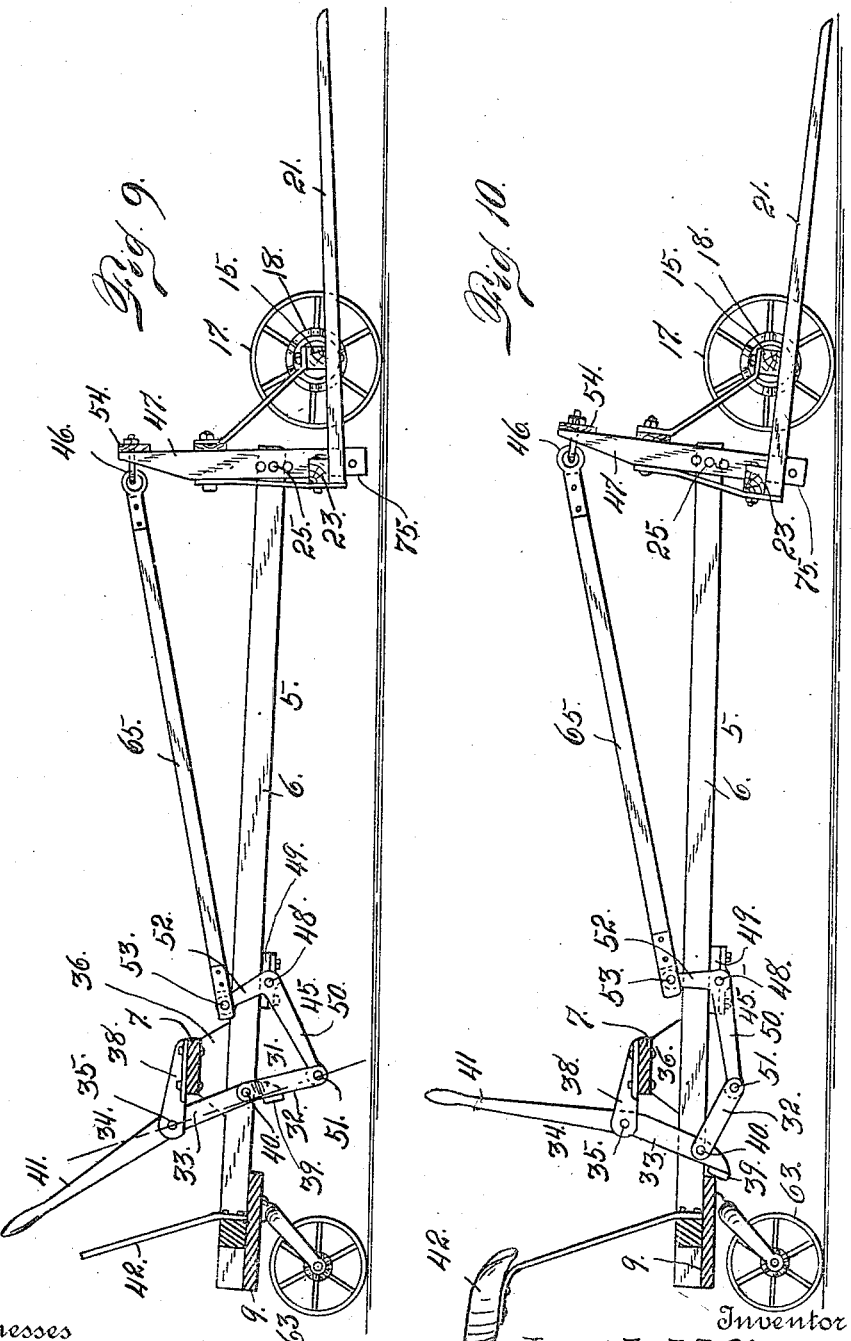

JOSEPH H. COPE, OF WINDSOR, COLORADO, ASSIGNOR TO THE WINDSOR MANUFACTURING COMPANY, OF WINDSOR, COLORADO, A CORPORATION OF COLORADO.

SWEEP-RAKE.

1,277,551.  Specification of Letters Patent.  Patented Sept. 3, 1918.

Application filed August 22, 1913. Serial No. 786,058.

*To all whom it may concern:*

Be it known that I, JOSEPH H. COPE, a citizen of the United States, residing at Windsor, county of Weld, and State of Colorado, have invented certain new and useful Improvements in Sweep-Rakes; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in sweep rakes. Rakes of this character are more especially employed in handling hay, the work consisting in gathering hay upon the head of the rake which is pushed in front of the horses which are hitched to the rear end thereof and occupy positions between the rear end of the structure and the rake head. After a load is gathered, the head of the rake is raised and locked in the raised position after which the rake is pushed to the stack or other location where the hay is to be removed.

An important feature of my improvement consists in the means for raising the rake head and locking the same in the raised position after the load of hay has been gathered or has accumulated thereon due to the moving of the head of the rake in its lowered position until the load is gathered. The construction, whereby the rake head and its connections are raised and locked in the elevated position is exceedingly simple in construction, economical in cost, and thoroughly efficient in use. Furthermore, it is easily operated, both for the purpose of throwing it into the locked position or into the released position.

Another feature of novelty consists in connecting the power frame of the rake, with the rake head in a plane above the axle upon which the wheels of the head are mounted, whereby during the hay gathering operation, the power applied by the draft animals has a tendency to maintain the teeth of the rake in the lowered position.

Still another feature consists in the special construction of the rake head, whereby its outer portions on opposite sides beyond the wheels are reinforced or strengthened by braces suitably arranged for the purpose.

The novel features of the construction including the details of those heretofore outlined will be made plain as this specification proceeds.

Referring to the drawings, forming a part of this specification—

Figure 1 is a top plan view of a sweep rake equipped with my improvements.

Fig. 2 is a section taken on the line 2—3, Fig. 1, showing the rake head in the raised position and the locking devices correspondingly adjusted.

Fig. 3 is a view taken on the same line, showing the rake head in the lowered position and the locking devices released.

Fig. 4 is a cross section taken on the line 4—4, Fig. 1, looking toward the right.

Fig. 5 is a section taken on the line 5—5, Fig. 2, looking toward the right.

Fig. 6 is a section taken on the line 6—6, Fig. 3, viewed in the same direction.

Fig. 7 is a section taken on the line 7—7, Fig. 4, looking toward the left.

Fig. 8 is a section taken through the axle of the machine between the two ground wheels.

Fig. 9 is a view similar to Fig. 2, but showing a slightly modified form of locking construction, the head of the rake being in the raised position.

Fig. 10 is a similar view with the rake head in the lowered position.

The same reference characters indicate the same parts in all the views.

Referring first more particularly to the construction shown in Figs. 1 to 8 inclusive, let the numeral 5 designate the rear portion of the frame-work of the machine which consists of bars 6 longitudinally disposed and connected by a transverse member 7. To the bars 6 are also secured brace members 8 whose rear extremities are connected with a plate 9 which connects the bars 6 occupying a plate immediately below the said bars. To the braces 8 are attached members 10 arranged on opposite sides and to whose outer extremities whiffle trees 12 are attached, the members 10 being reinforced and supported by metal straps 13 which are connected at one extremity with the outer ends of the members 10 and at their inner extremities to the rear ends above the bars 6.

The head 14 of the rake includes a transversely arranged axle 15 which is mounted on ground wheels 17, the wheels being journaled on the axle which is square in cross section, but exteriorly bushed by parts 16 which are fitted to the squared axle interiorly, but exteriorly are cylindrical in shape to fit the interior bore of the hub 18 of each wheel, the latter being journaled on the bushing. These bushing parts are locked against longitudinal movement on the axle by means of stop lugs 19 secured to the axle as shown at 20, the said lugs being arranged at the opposite ends of the bushing members and applied to the axle both above and below, in order to lock both bushing members against lateral travel.

The teeth 21 of the rake are secured to the axle by means of fastening devices 22, the teeth being arranged below the axle and their rear extremities being further secured to a transversely arranged bar 23 which is parallel with the axle and connected with the rear extremity of each rake tooth by means of a bolt 24 or any other suitable fastening device.

The forward extremities of the bars 6 are pivotally connected with the head of the rake by means of pins 25 which pass through openings formed in the forward extremity of the said bars and engage bearings 26 suitably arranged on the rake head. These pins are arranged above the axle of the structure whereby when the power of the draft animals is applied in a forward direction during the operation of the rake, there is a tendency to force the forward extremities of the rake teeth downwardly by reason of the fact that the pins 25 are carried by a structure which is rigid with the rake head of which the axle forms a part, and being arranged above the fulcrum of the head which is composed of the ground wheels 17, the forward thrust due to the application of the power of the draft animals must produce the aforesaid result.

Centrally arranged between the two bars 6 of the framework of the machine, is a third bar 27 whose forward extremity is rigidly secured to the axle of the machine as shown at 28, the forward portion of the bar 27 being further connected with the axle by means of braces 29 arranged on opposite sides of the said bar. The rear extremity of this bar is connected as shown at 30, with one extremity of a link 31 which as illustrated in the drawing, is composed of two members 32 whose lower extremities are arranged on opposite sides of the rear end of the bar 27 and whose upper extremities are bent inwardly to engagement with the lower arm 33 of a lever 34 which is fulcrumed at 35, the fulcrum being supported upon a built up structure 36 upon which the transverse member 7 of the framework is mounted, the fulcrum plate 38 being secured to the upper surface of the frame member 7 as well illustrated in Figs. 1 to 3, inclusive of the drawing. The structure 36 consists of two parts which are respectively supported by the frame bars 6 of the machine.

The lower arm 33 of the lever 34 has a foot plate 39 rigidly connected to its lower end and extending below the pivot 40 which connects the link 31 with the lower arm of the lever, the object of the foot plate being to facilitate the operation of the locking structure by the use of the foot which may serve either alone or in conjunction with the hand of the operator. The upper and longer arm 41 of the lever 34 is arranged in convenient proximity to the driver or person in charge of the machine, who occupies a seat 42 suitably arranged at the rear extremity of the structure and between the frame bars 6.

As the forward end of the bar 27 is rigidly connected with the axle of the machine and also with the head bar 23, as the rear end of the beam 27 is raised, the head of the rake which is fulcrumed on the wheels 17 as heretofore explained, will be actuated to throw the points of the teeth toward the ground or cause the head of the rake to assume the hay gathering position. When in this position, the pivot bolt 40 occupies a position rearward of the straight line 43 passed through the bolts 35 and 30, see Fig. 2, the bolt 35 forming the fulcrum of the lever 34, and the bolt 30 the means for connecting the lower end of the link 31 with the bar 27.

In the form of construction shown in Figs. 9 and 10, the locking lever construction is substantially the same, with the exception that a bell crank lever 45 is interposed between the link 31 and a rod 65 which is connected as shown at 46 with the upper extremity of an upright structure 47 mounted on the rake head in the rear of the axle 15 of the machine.

By virtue of the construction shown in Figs. 9 and 10, my improved locking devices are made adaptable to other specific forms of sweep rake constructions and particularly to the form illustrated in Figs. 9 and 10 which is slightly different from the construction shown in the other views.

In this case, the bell crank lever 45 is fulcrumed at 48 by means of a bearing 49 secured to the under surface of the beam 27 forward of the lever 34 and the link 31. The rear arm 50 of this bell crank lever is pivotally connected with the lower end of the link 31 as shown at 51, while its upper arm 52 is pivotally connected as shown at 53 with the rear end of the rod 65.

It will be observed from an inspection of Figs. 9 and 10 of the drawing, and by comparison of the construction therein disclosed, with that illustrating Figs. 1, 2 and 3, that the operation of the locking devices will be substantially the same in the structure shown in Figs. 9 and 10, as that heretofore described, when special reference was made to Figs. 1 to 3, inclusive.

Referring now to the special construction of the rake head, a bar 54 is transversely arranged above the teeth of the head and between the axle and the transverse member 23, the bar 54 being supported by centrally located front and rear braces 55 and 56 and by other braces 57, raised on opposite sides of the center of the head, the lower extremities of the braces 57 being secured as shown at 58 to the members 29 of the machine.

The part 54 is further supported on opposite sides of the center of the head by means of front and rear braces designated 59 and 60, respectively.

The opposite extremities of the part 54 are arranged some distance from the opposite ends of the rake head, the part 54 being shorter than the width of the head. Hence, it becomes necessary to support the portions of the head beyond the extremities of the part 54, to prevent these parts of the head from sagging under the weight of the load. This is accomplished by additional braces 60 arranged on opposite sides of the machine, their lower extremities being secured to the opposite ends of the axle as shown at 61, and their upper extremities being connected with the opposite ends of the bar 54 as shown at 62.

From the foregoing description, the use and operation of my improved sweep rake will be readily understood. During the operation of gathering hay with a machine of this character, the head of the rake is caused to travel forward of the horses whose power is directed forwardly on the bars 6, whereby the forward extremities of the teeth of the rakes are maintained in their lowermost position due to the fact that the forward extremities of the draft bars 6 are pivotally connected with the rake head above the axle of the wheels 17 of the head. In this event, the various parts of the machine are in the position best illustrated in Figs. 3 and 10 of the drawing. As soon as a load 44 of hay is gathered on the head of the rake, the operator or the person in charge of the machine manipulates the lever 34 to throw the parts into the position illustrated in Figs. 2 and 9 whereby the load of hay is raised above the ground and may be carried any desired distance, since a rake of this character is supported not only by the ground wheels 17 but also by rearwardly located wheels 63. When the rake head is raised, the locking lever mechanism assumes the position illustrated in Figs. 2 and 9 of the drawing, whereby the tendency of the load upon the head cannot operate to release the locking construction, since in both forms of the construction, the center of the pivot bolt 40 is located forward of a line 43 passed through the centers of the fulcrum bolt 25 and the pivot bolt 30.

When it is desired to release the locking mechanism and drop the head of the rake to the hay gathering position, the upper arm 41 of the hand lever 34 is moved in the direction of the arrow $a$, as heretofore explained.

Attention is called to the fact that the projection 39 of the lever acts upon the link 31 to limit the travel of the link and lever joint when actuated to lift the rake head. A part of this projection is offset from the lever arm 33 whereby one member of the link is in its path during the forward travel of the pivot bolt 40 connecting the lever arm 33 with the link, so that when the said pivot bolt has traveled beyond the dead center position in the direction to depress the bar 27 or impart a corresponding movement to the rod 65 to raise the rake head, the pivot bolt and the parts connected thereby are locked against further travel. This is essential to the operation of the construction, since were it not for this stop feature, the pivot bolt would continue its forward travel and allow the rake head to fall as soon as it had been raised to the proper position to support the load as heretofore described. Hence, it must be understood that in a construction of this character the link and lever can fold or collapse only in one direction, being the direction of the travel of the pivot bolt 40 when the link and lever are actuated to allow the rake head to drop or assume the hay gathering position.

The forward extremities of the bars 6 may be vertically adjustable on the rake head as illustrated in Figs. 9 and 10 in which additional perforations for the pivot pin 25 are illustrated. The object of this construction is to regulate the leverage whereby the forward thrust of the push bars when the machine is in use may be advantageously utilized to properly hold the rake head and teeth in the hay gathering position.

The upright structure 47 may extend below the axle 15 of the rake head as shown at 75, this downward extension being perforated to permit the longitudinally disposed bars 6 to be connected with the said extension, whereby the forward thrust due to the power of the draft animals in imparting the traveling movement to the machine, may be utilized to impart a lifting tendency to the portion of the rake head forward of the axle, in case the downward tendency of this portion of the rake head should be greater than is desired.

Having thus described my invention, what I claim is:

In a sweep rake, the combination with the rake head and a part extending rearwardly from the head and connected therewith to raise and lower the same, of a lever fulcrumed between its extremities, a link pivotally connected at one extremity with one arm of the lever, an operative pivotal connection between the opposite extremity of the link and the said part extending rearwardly from the rake head comprising a bell crank lever pivoted intermediate its ends, and means mounted upon the lever for stopping the travel of the toggle formed by the link and an arm of the lever when the axis of the joint of the said toggle has passed slightly forward of a line substantially vertical passing through the axis of the fulcrum and the connection between the link and the bell crank lever.

In testimony whereof I affix my signature in presence of two witnesses.

JOSEPH H. COPE.

Witnesses:
ANNA L. LEHMAN,
A. J. O'BRIEN.